United States Patent [19]

Kofink

[11] 4,156,171

[45] May 22, 1979

[54] DUAL VOLTAGE, DUAL BATTERY CHARGING SYSTEM

[75] Inventor: Wolfgang Kofink, Aichwald, Fed. Rep. of Germany

[73] Assignee: Robert Bosch GmbH, Stuttgart, Fed. Rep. of Germany

[21] Appl. No.: 831,664

[22] Filed: Sep. 8, 1977

[30] Foreign Application Priority Data

Oct. 9, 1976 [DE] Fed. Rep. of Germany ....... 2645784

[51] Int. Cl.² .............................................. H02J 7/14
[52] U.S. Cl. ....................................... 320/17; 307/16; 320/57; 322/90
[58] Field of Search ..................... 320/6, 7, 17, 15, 16, 320/64, 68, 29, 57, 59; 322/90; 307/16

[56] References Cited

U.S. PATENT DOCUMENTS

| | | | |
|---|---|---|---|
| 3,710,226 | 1/1973 | Seike | 320/15 |
| 3,809,995 | 5/1974 | Hardin | 322/90 X |
| 4,044,293 | 8/1977 | Follmer | 320/15 |
| 4,045,718 | 8/1977 | Gray | 322/90 X |

FOREIGN PATENT DOCUMENTS 2162328  8/1972  Fed. Rep. of Germany.

*Primary Examiner*—Robert J. Hickey
*Attorney, Agent, or Firm*—Frishauf, Holtz, Goodman & Woodward

[57] ABSTRACT

To provide for automatic charging of two batteries which are series connected, particularly to supply the on-board network of an automotive vehicle from a main battery and to supply additional higher surge voltage output to the vehicle starter, a three phase alternator has output rectifiers connected to two phases, and the rectifier to the main battery, the third phase with its rectifier being connected to the auxiliary battery. The third phase rectifier may, instead of diodes, include a diode-transistor combination, the transistor being controlled by voltage of the second battery to, selectively, charge the second battery or connect the third phase for charging of the main battery. The phase windings of the alternator may all be identical, the lighter loading of the phase connected to the additional battery providing the higher output voltage required thereby.

12 Claims, 3 Drawing Figures

DUAL VOLTAGE, DUAL BATTERY CHARGING SYSTEM

The present invention relates to a charging system for a multi-voltage, typically dual voltage electrical network for vehicles, and more particularly to automotive type 12/24V or similar voltage systems in which the higher voltage can be provided to supply loads particularly adapted to higher voltage operation, such as the starter of the vehicle.

BACKGROUND AND PRIOR ART

Various types of multi-voltage level on-board systems have been proposed. Typically, the voltages can be 12 volts and 24 volts. The 12 volt system is used, in well known manner, to supply the usual load encountered in the vehicle such as headlights, signalling lights, radios and the like. The 24 volt system is particularly adapted to supply power to high power loads, such the starter of the vehicle. The high power users require higher operating currents if the battery voltage drops. High currents cause numerous problems, such as heating of electrical supply lines, high resistance contacts or terminals, and the like. Raising the overall on-board voltage for all loads is not necessarily desirable, however, since the lifetime of many loads decreases with increasing voltage—for example incandescent lamps—and problems with insulation arise, particularly in the presence of moisture. To match the voltage level to the various loads for optimum performance, it has previously been proposed to provide multi-voltage circuits in the on-board network of the vehicle. The normal, usually supplied battery supplies the customary and usual and connected loads of the vehicle. The second battery is added only when loads requiring high power are to be connected. The starter is then supplied from both the main battery and an auxiliary battery, connected in series. This system has difficulties, however, since switch-over of the batteries is required in dependence on the operating system and network of the vehicle. Separate switch-over circuits are needed in order to permit charging of both batteries by the alternator of the vehicle. Normally, the alternators are designed to provide output power only at a single voltage level. Under ordinary operation of the vehicle, a single battery is sufficient. The second series connected battery which is usually used only upon starting of the vehicle is not loaded or needed in normal operation. As far as the charging circuit of the battery system, then, is concerned, the second battery requires charging at a much lower level, and with less energy and at a lower power level than charging of the main battery.

The textbook by Kirdorf, "Praxis der Autoelektrick, Vol IV, Page 195, (1970)," describes a circuit in which two batteries are switched by a battery transfer switch. This system has the disadvantage that a high voltage transfer switch is necessary in order to connect the batteries in accordance with the operating mode of the vehicle. Such transfer or change-over switches are subject to malfunction and are expensive. It has also been proposed to generate a second, higher voltage from the rectified voltage of an alternator of a vehicle by using a voltage doubling circuit. Such a circuit—known as such—can be used since the additional or auxiliary battery requires only a relatively low charging current. Electronic voltage double circuits have the disadvantage, however, that they require modification of the three phase rectifier used with the alternator and that the circuit is comparatively complex and hence expensive.

THE INVENTION

It is an object of the present invention to provide a multi-voltage on-board vehicle network system, using two batteries which is simple, inexpensive and can utilize commercial alternators without modification, and which permits efficient use of components as well as of power supplied to the alternator.

Briefly, the rectifier from the alternator is split into two groups; one group has two rectifier diode pairs which are connected in normal bridge rectifier form to two phases of a three phase alternator, the output being connected to the main battery. The other group is formed of a diode and a semiconductor diode junction—which may be a diode or a transistor—and is connected from the third phase of the alternator to the auxiliary battery. Since the third phase is not loaded heavily, its voltage will be at a higher level than the output voltage of the two phases which are heavily loaded and supply the main battery.

In accordance with a feature of the invention, the diode junction is a transistor, the conduction of which is controlled so that, under blocked state, its collector-base junction supplies power from the third phase to the auxiliary battery; if the transistor is rendered conductive, however, power is delivered through the transistor from the third phase to the main battery as well. The transistor is controlled by a voltage sensing element, for example a Zener diode, connected to the base thereof and to the auxiliary battery. Since the transistor conducts, inherently, in only one direction, a further rectifying diode is not needed, the transistor itself providing the rectifying junction.

The system has the advantage that it can utilize existing elements and existing alternator structures. The circuit is simple, inexpensive to manufacture and arrange and reliable in use.

Rather than using a transistor as to diode junction device, which is automatically controlled, it is also possible to use a mechanical switch by which the third phase, and its rectifying diode is connected to the main battery. A diode in the connection from the auxiliary battery to the charging circuit additional to the rectifying diode prevents reverse current flow. Use of such a switch, in mechanical form or preferably in automatically controlled semiconductor form is a preferred embodiment since the change-over will be entirely automatic and does not involve mechanical contact.

DRAWINGS, ILLUSTRATING AN EXAMPLE

Figure 3:
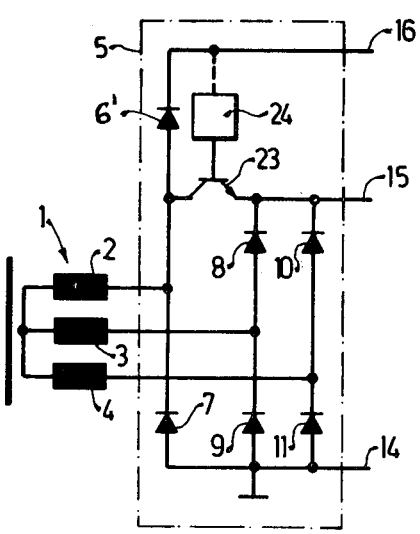

And FIG. 3 is a fragmentary diagram of another embodiment of the rectifier system and using automatic switch-over of the rectifier connected to the third phase and to the auxiliary battery or, selectively, to the main battery in depenedence on the respective charge states of the batteries.

An alternator 1 of a vehicle has three stator windings 2, 3, 4. The field winding (not shown) is connected as well known to a voltage regulator and may additionally be connected to the main battery 12. The armature windings 2, 3, 4 of the alternator 1 are connected to respective junctions of a rectifier bank 5. The bank 5 is a bridge-type three phase rectifier and provides two output voltages with respect to a chassis, ground, or reference bus 14. Twelve volts are available on bus 15; this is the customary, nominal vehicle voltage for modern vehicles. A battery 12 is connected between bus 15 and bus 14. Twenty-four volts are at bus 16. An auxiliary battery 13 is connected between bus 16 and bus 15. The twelve volt line 15 is connected to a switch 17 which can connect a load 18 to the network. The load 18, shown schematically as a variable resistor, in the vehicle, represents the usual loads, for example headlights, direction indicators, communication equipment, control circuits and the like. A switch 19 is connected to the positive terminal of battery 13 and it, in turn, connects this terminal to a load 20. The load 20 is shown as the starter motor and is used only intermittently, that is, does not represent a normal loading for the electrical network of the vehicle.

The bridge rectifier 5 has three pairs of diodes 6/7; 8/9; 10/11; the three diode pairs are connected to the respective three phase windings 2, 3, 4 of the alternator 1. Diodes 7, 9, 11 have their cathodes connected to reference bus 14 and are usually referred to as the negative diodes, whereas the diodes 6, 8, 10, which have their cathodes connected to the respective buses 15, 16, are referred to as the positive diodes.

In accordance with the present invention, and contrary to the usual connection of the alternator rectifiers, the three cathodes of the diodes 6, 8, 10 are not connected to a common line and to the positive terminal of the d-c supply; rather, diode 6 is isolated as a separate group and its cathode is not connected to the twelve volt bus 15 but rather is connected to the separate twenty-four volt bus 16.

The first, or main battery 12 and the second or auxiliary battery 13 are charged by the system as follows: battery 12 is charged over armature windings 3, 4 of the alternator 1; the auxiliary battery 13 is charged only by armature winding 2 of the alternator 1. The armature winding 2 is substantially less loaded than armature windings 3, and 4 and thus generates a higher voltage—the voltage required to charge the series circuit of the main battery 12 and the auxiliary battery 13. Switch 17 thus is capable of connecting the normal electrical loads, symbolized by resistor 14, to the twelve volt bus 15. A higher voltage, if required, for example twenty-four volts for starter motor 20 can be obtained by closing switch 19 and connecting motor 20 to the twenty-four volt bus 16. This is usually required only during starting of the vehicle. Normal vehicle operation usually only requires loads connected to switch 17 and to add or change the loading, as operating conditions demand.

The diode groups 8/9, 10/11, therefore, supply battery 12 and the diode group 6/7 supplies batteries 13 and 12.

If the alternator can be easily modified, then the phase winding 2 of the alternator can be expanded by additional windings 25 in order to obtain sufficiently high voltage to charge the series connection of batteries 12 and 13.

Figure 1:
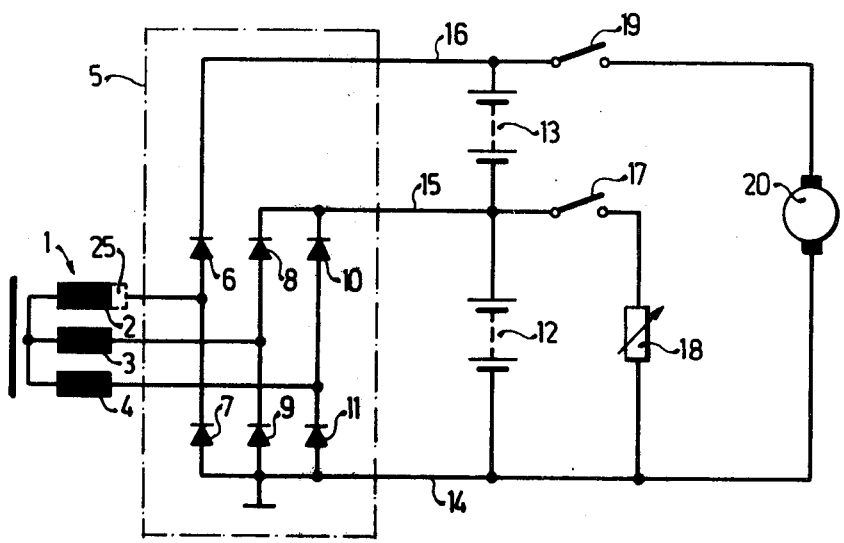
FIG. 1 is a complete circuit diagram of the basic network in accordance with the present invention omitting elements not necessary for an understanding thereof.
Figure 2:
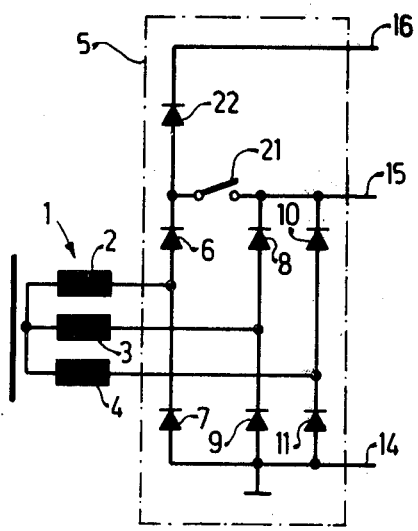
FIG. 2 is a fragmentary circuit diagram showing the portion of the charging rectifier in a modified form.

Embodiment of FIG. 2: the cathode of diode 6 is connected through a switch 21 to positive twelve volt bus 15. Under ordinary operation of the vehicle, that is, if high power loads are not connected, the alternator 1 and the charging system can be operated as well known by both groups of diodes. The blocking diode 22 is connected between bus 16 and diode 6 to prevent discharge of one battery through the other and to block reverse current flow.

Embodiment of FIG. 3: this is similar to FIG. 2 except that the mechanical switch 21 has been replaced by an electronic switch, shown as transistor 23. The conduction of transistor 23 is controlled by a control unit 24. Control unit 24 may contain, for example, a threshold switch in the form of a transistor and a Zener diode in its base connection. The control unit 24 is connected to the base of transistor 23. Preferably, control unit 24 is connected to the auxiliary 24 V bus 16. Charging of battery 13 thus is automatically controlled: recharge of battery 13 will commence when the voltage of the second battery 13 has dropped below a predetermined value, for example as set with respect to the reference Zener diode in unit 24. When the second battery 13 is sufficiently charged, transistor 23 is controlled to be conductive. The transistor 23 has plural function: it not only replaces the mechanical switch 21 but additionally replaces diode 22 and has the function of diode 6, since its collector-base-and base-emitter paths are conductive in only one direction. A diode 6 is provided as in the embodiment of FIG. 2 to provide sufficient charging current for the auxiliary battery 13 and prevent reverse current flow.

The system is not limited to a 12 V/24 V system; any desired other voltages can be selected by suitable dimensioning of the components and of the alternator 1. Various changes may be made, and features described in connection with any one of the embodiments may be used with any one of the others, within the scope of the inventive concept.

I claim:

1. Dual voltage system for dual voltage automotive vehicular on-board networks having
   a first or main battery (12) and a second or auxiliary battery (13) connected in series with a main battery; and
   a three-phase charging alternator (5) and a rectifier connected between the output of the alternator and the batteries
   wherein
   the rectifier comprises two pairs of diode junction devices (8, 9; 10, 11), each pair being connected to one phase winding (3, 4) of the alternator and connected to rectify the output of the respective phase winding and supply the rectified output to the main battery (12) to charge the same, whereby the battery can supply loads at a voltage level of said main battery;
   and two further diode junction devices connected to the third phase winding (2) and being directly connected in parallel circuit relationship to the series connection of the main battery (12) and the auxiliary battery (13).

2. System according to claim 1, wherein said diode junction devices comprise rectifying diodes (8, 9; 10, 11; 6, 7).

3. System according to claim 1, wherein at least the diode devices of said two pairs comprises rectifying diodes (8, 9; 10, 11);
   and at least one diode junction device of said two further diode junction devices comprises the collector-base junction of a transistor (23).

4. System according to claim 1, further comprising a switch (21) connected between the output of the diode junction device (6) connected to the auxiliary battery (13) and like polarized diode junction devices (8, 10) of said two pairs to permit connection of said third phase winding to supply charging current to the main battery (12).

5. System according to claim 4, further comprising a blocking diode (22) between the auxiliary battery (13) and the junction of said switch (21) and said further diode junction device (6) to prevent reverse current flow from said auxiliary battery.

6. System according to claim 4, wherein said switch comprises a semiconductor switch.

7. System according to claim 1, wherein one of the further diode junction devices comprises the collector-base junction of a transistor (23), the emitter of said transistor (23) being connected to the main battery (15); and voltage sensitive control means (24) controlling conduction of the transistor (23) in dependence on voltage of the auxiliary battery (13).

8. System according to claim 1, further including an additional winding (25) in series with the third phase winding (22) of the alternator.

9. System according to claim 1, further comprising a main power control switch (17) connected to the junction between said batteries (12, 13) to connect main loads (18) to said main battery at the voltage level thereof.

10. System according to claim 1, further comprising an auxiliary load control switch (19) connected to the positive terminal of the auxiliary battery (13) to connect a load to said terminal at the voltage level of both said batteries, in series.

11. System according to claim 10, wherein said load connected to both said batteries in series comprises the starter motor of an automotive vehicle.

12. System according to claim 6, wherein the voltage sensitive control means (24) are connected to the positive terminal of the auxiliary battery (13).

* * * * *